(12) United States Patent
Kimura

(10) Patent No.: US 9,914,552 B2
(45) Date of Patent: Mar. 13, 2018

(54) INTEGRATED CONTROL DEVICE AND INTEGRATED CONTROL PROGRAM

(71) Applicant: Mitsubishi Electric Corporation, Chiyoda-ku (JP)

(72) Inventor: Takehisa Kimura, Chiyoda-ku (JP)

(73) Assignee: Mitsubishi Electric Corporation, Chiyoda-ku (JP)

( * ) Notice: Subject to any disclaimer, the term of this patent is extended or adjusted under 35 U.S.C. 154(b) by 0 days.

(21) Appl. No.: 14/915,037

(22) PCT Filed: Aug. 28, 2014

(86) PCT No.: PCT/JP2014/004426
§ 371 (c)(1),
(2) Date: Feb. 26, 2016

(87) PCT Pub. No.: WO2015/029438
PCT Pub. Date: Mar. 5, 2015

(65) Prior Publication Data
US 2016/0207643 A1    Jul. 21, 2016

(30) Foreign Application Priority Data

Aug. 29, 2013 (JP) .................. 2013-178334

(51) Int. Cl.
*B64G 3/00* (2006.01)
*B64G 99/00* (2009.01)
(Continued)

(52) U.S. Cl.
CPC ............. *B64G 3/00* (2013.01); *B64G 9/00* (2013.01); *G05B 19/042* (2013.01); *G05B 23/0251* (2013.01)

(58) Field of Classification Search
CPC ........... B64G 3/00; B64G 9/00; G05B 19/042
See application file for complete search history.

(56) References Cited

U.S. PATENT DOCUMENTS

| 5,659,788 A | 8/1997 | Someya et al. |
| 2008/0091382 A1 | 4/2008 | Ang et al. |

(Continued)

FOREIGN PATENT DOCUMENTS

| JP | 6-301436 A | 10/1994 |
| JP | 2004-334576 A | 11/2004 |

(Continued)

OTHER PUBLICATIONS

International Search Report dated Nov. 25, 2014 for PCT/JP2014/004426 filed on Aug. 28, 2014.

(Continued)

*Primary Examiner* — Mussa A Shaawat
*Assistant Examiner* — Michael V Kerrigan
(74) *Attorney, Agent, or Firm* — Oblon, McClelland, Maier & Neustadt, L.L.P.

(57) ABSTRACT

An integrated control device that assigns a same attribute to plural pieces of status information integrally monitored over at least two or more pieces of equipment, to derive integrated status information and integrate the plural pieces of status information. An integration processor derives the integrated status information such that a group of pieces of preset status information is referenced with respect to plural pieces of status information with a same attribute from among status information of monitoring target functions stored in monitoring data of equipment and provided for each of plural pieces of the equipment to be monitored or an operation applying an operator being set for each attribute to pieces of status information with the same attribute from among status information of monitoring target functions stored in monitoring data of equipment and provided for each of plural pieces of the equipment to be monitored is carried out.

6 Claims, 15 Drawing Sheets

(51) Int. Cl.
  *G05B 19/042* (2006.01)
  *G05B 23/02* (2006.01)

(56) References Cited

U.S. PATENT DOCUMENTS

| | | |
|---|---|---|
| 2010/0013634 A1 | 1/2010 | Kanna |
| 2010/0017167 A1 | 1/2010 | Duc et al. |
| 2010/0217618 A1* | 8/2010 | Piccirillo .............. G06F 19/327 705/2 |
| 2012/0259505 A1 | 10/2012 | Turban et al. |

FOREIGN PATENT DOCUMENTS

| | | |
|---|---|---|
| JP | 2008-70996 A | 3/2008 |
| JP | 2008-234351 A | 10/2008 |
| WO | 2008/117793 A1 | 10/2008 |

OTHER PUBLICATIONS

Extended European Search Report dated Apr. 3, 2017 in European Patent Application No. 14839539.5.

* cited by examiner

FIG.3A

| Integrated status information | Status information (Monitoring data A) | Status information (Monitoring data B) | Logical operator |
|---|---|---|---|
| OK | OK | OK | AND |
| NG | OK | NG | AND |
| NG | NG | OK | AND |
| NG | NG | NG | AND |

FIG.3B

| Integrated status information | Status information (Monitoring data A) | Status information (Monitoring data B) | Logical operator |
|---|---|---|---|
| OK | OK | OK | OR |
| OK | OK | NG | OR |
| OK | NG | OK | OR |
| NG | NG | NG | OR |
| OK | OK | Not inputted | OR |
| Not determined | NG | Not inputted | OR |
| OK | Not inputted | OK | OR |
| Not determined | Not inputted | NG | OR |

FIG.3C

| Integrated status information | Status information (Monitoring data A) | Status information (Monitoring data B) | Logical operator |
|---|---|---|---|
| NG | OK | OK | NOR |
| OK | OK | NG | NOR |
| OK | NG | OK | NOR |
| OK | NG | NG | NOR |

FIG.6A

| Integrated status information (Data C) | Satellite 13 status information (Data A) | Ground station 12 status information (Data B) | Logical operator |
|---|---|---|---|
| OK | OK | OK | AND |
| NG | OK | NG | AND |
| NG | NG | OK | AND |
| NG | NG | NG | AND |

FIG.6B

| Integrated status information (Data C) | Satellite 13 status information (Data A) | Ground station 12 status information (Data B) | Logical operator |
|---|---|---|---|
| OK | OK | OK | OR |
| OK | OK | NG | OR |
| OK | NG | OK | OR |
| NG | NG | NG | OR |
| OK | OK | Not inputted | OR |
| Not determined | NG | Not inputted | OR |
| OK | Not inputted | OK | OR |
| Not determined | Not inputted | NG | OR |

FIG.6C

| Integrated status information (Data C) | Satellite 13 status information (Data A) | Ground station 12 status information (Data B) | Logical operator |
|---|---|---|---|
| NG | OK | OK | NOR |
| OK | OK | NG | NOR |
| OK | NG | OK | NOR |
| OK | NG | NG | NOR |

FIG.7

| Integrated status information (Data C) | Satellite 13 status information (Data A) | Ground station 12 status information (Data B) |
|---|---|---|
| 4 | 1 | 2 |
| 4 | 1 | 3 |
| 1 | 1 | 4 |
| 4 | 1 | 5 |
| 3 | 2 | 2 |
| 4 | 2 | 3 |
| 1 | 2 | 4 |
| 4 | 2 | 5 |
| 4 | 3 | 2 |
| 3 | 3 | 3 |
| 4 | 3 | 4 |
| 2 | 3 | 5 |

FIG.8A

| Integrated status information (Data C) | Satellite 13 status information (Data A) | Ground station 12 status information (Data B) | Arithmetic operator |
|---|---|---|---|
| 3 | 1 | 2 | + |
| 4 | 1 | 3 | + |
| 5 | 1 | 4 | + |
| 6 | 1 | 5 | + |
| 4 | 2 | 2 | + |
| 5 | 2 | 3 | + |
| 6 | 2 | 4 | + |
| 7 | 2 | 5 | + |
| 5 | 3 | 2 | + |
| 6 | 3 | 3 | + |
| 7 | 3 | 4 | + |
| 8 | 3 | 5 | + |

FIG.8B

| Integrated status information (Data C) | Satellite 13 status information (Data A) | Ground station 12 status information (Data B) | Arithmetic operator |
|---|---|---|---|
| -1 | 1 | 2 | - |
| -2 | 1 | 3 | - |
| -3 | 1 | 4 | - |
| -4 | 1 | 5 | - |
| 0 | 2 | 2 | - |
| -1 | 2 | 3 | - |
| -2 | 2 | 4 | - |
| -3 | 2 | 5 | - |
| 1 | 3 | 2 | - |
| 0 | 3 | 3 | - |
| -1 | 3 | 4 | - |
| -2 | 3 | 5 | - |

FIG.9A

| Integrated status information (Data C) | Satellite 13 status information (Data A) | Ground station 12 status information (Data B) | Arithmetic operator |
|---|---|---|---|
| 1/2 | 1 | 2 | ÷ |
| 1/3 | 1 | 3 | ÷ |
| 1/4 | 1 | 4 | ÷ |
| 1/5 | 1 | 5 | ÷ |
| 1 | 2 | 2 | ÷ |
| 2/3 | 2 | 3 | ÷ |
| 1/2 | 2 | 4 | ÷ |
| 2/5 | 2 | 5 | ÷ |
| 3/2 | 3 | 2 | ÷ |
| 1 | 3 | 3 | ÷ |
| 3/4 | 3 | 4 | ÷ |
| 3/5 | 3 | 5 | ÷ |

FIG.9B

| Integrated status information (Data C) | Satellite 13 status information (Data A) | Ground station 12 status information (Data B) | Arithmetic operator |
|---|---|---|---|
| 2 | 1 | 2 | × |
| 3 | 1 | 3 | × |
| 4 | 1 | 4 | × |
| 5 | 1 | 5 | × |
| 4 | 2 | 2 | × |
| 6 | 2 | 3 | × |
| 8 | 2 | 4 | × |
| 10 | 2 | 5 | × |
| 6 | 3 | 2 | × |
| 9 | 3 | 3 | × |
| 12 | 3 | 4 | × |
| 15 | 3 | 5 | × |

FIG.9C

| Integrated status information (Data C) | Satellite 13 status information (Data A) | Ground station 12 status information (Data B) | Arithmetic operator |
|---|---|---|---|
| 2 | 1 | 2 | ×2 |
| 3 | 1 | 3 | ×3 |
| 2 | 1 | 4 | ×2 |
| 2 | 1 | 5 | ×2 |
| 4 | 2 | 2 | ×2 |
| 6 | 2 | 3 | ×3 |
| 4 | 2 | 4 | ×2 |
| 4 | 2 | 5 | ×2 |
| 6 | 3 | 2 | ×2 |
| 9 | 3 | 3 | ×3 |
| 6 | 3 | 4 | ×2 |
| 6 | 3 | 5 | ×2 |

FIG.10

| Integrated status information (Data C) | Satellite 13 status information (Data A) | Ground station 12 status information (Data B) | Arithmetic operator |
|---|---|---|---|
| 2 | 1 | 2 | ≤ |
| 2 | 1 | 3 | ≤ |
| 2 | 1 | 4 | ≤ |
| 2 | 1 | 5 | ≤ |
| 2 | 2 | 2 | ≤ |
| 2 | 2 | 3 | ≤ |
| 2 | 2 | 4 | ≤ |
| 2 | 2 | 5 | ≤ |
| 1 | 3 | 2 | > |
| 2 | 3 | 3 | ≤ |
| 2 | 3 | 4 | ≤ |
| 2 | 3 | 5 | ≤ |

FIG.11

| Integrated status information (Data E) | Satellite 13 status information (Data A) | Satellite 13 status information (Data B) | Ground station 12 Status information (Data C) | Mission facility 14 status information (Data D) | Logical operator |
|---|---|---|---|---|---|
| OK | OK | OK | OK | OK | AND |
| NG | OK | OK | OK | NG | AND |
| NG | OK | OK | NG | OK | AND |
| NG | OK | OK | NG | NG | AND |
| NG | OK | NG | OK | OK | AND |
| NG | OK | NG | OK | NG | AND |
| NG | OK | NG | NG | OK | AND |
| NG | OK | NG | NG | NG | AND |
| NG | NG | OK | OK | OK | AND |
| NG | NG | OK | OK | NG | AND |
| NG | NG | OK | NG | OK | AND |
| NG | NG | OK | NG | NG | AND |
| NG | NG | NG | OK | OK | AND |
| NG | NG | NG | OK | NG | AND |
| NG | NG | NG | NG | OK | AND |
| NG | NG | NG | NG | NG | AND |

FIG.12

| Integrated status information (Data C) | Satellite 13 status Information (Data A) | Ground station 12 status information (Data B) | Logical operator |
|---|---|---|---|
| Normal | Lock | On | AND |
| Abnormal | Lock | Off | AND |
| Abnormal | Unlock | On | AND |
| Normal | Unlock | Off | AND |

INTEGRATED CONTROL DEVICE AND INTEGRATED CONTROL PROGRAM

TECHNICAL FIELD

The present disclosure relates to an integrated control device that, from among status information of monitoring target functions that is stored in monitoring data and is provided for each of a plurality of pieces of equipment to be monitored, assign a same attribute to a plurality of pieces of status information integrally monitored over at least two or more pieces of the equipment and integrate the plurality of pieces of status information.

BACKGROUND ART

An integrated control device has been in existence which collects monitoring data from a plurality of pieces of equipment through a control device, displays it on a screen, and provides states of the plurality of pieces of equipment for an operating manager. A case may be also included where a control device is united with the equipment to be monitored. Further, a case may be also included where a control device is united with the integrated control device.

Here, as an example, a case is described in which the plurality of pieces of equipment represent a satellite and a ground station, etc. A conventional control system that controls a satellite and a ground station, etc. comprises an integrated control device, a satellite control device, a mission facility control device, and a ground station control device. Each of the satellite control device, the mission facility control device, and the ground station control device corresponds to the above-described control device. An operating manager of the integrated control device can confirm, by an informing device to the outside such as a display unit, each of pieces of the monitoring data collected in the integrated control device from the satellite control device, the mission facility control device, and the ground station control device.

On the basis of each of pieces of the monitoring data that is confirmed, the operating manager of the integrated control device manages operation of the satellite and the ground station, etc. by integrally making a decision in an operational work. However, in recent years, in a control system that controls a satellite system constituting a plurality of satellites and a plurality of ground stations, etc., the amount of information on the monitoring data managed by the operating manager or the system is increasing. Further, the same situation applies to a case where target equipment to be controlled by the integrated control device corresponds to each of pieces of equipment that is a constituent for a collision-avoidance radar for an automobile or corresponds to a plurality of generators for photovoltaic power generation.

Therefore, it is desirable that, in order to reduce a burden on the operating manager and the system, an integrated control device or an integrated control system that can integrates a plurality of pieces of monitoring data be realized.

As a system that integrally controls the plurality of pieces of monitoring data, there exists an integrated operation monitoring system in which a monitoring level of all monitoring target servers and storage units in a plurality of subsystems controlled by a plurality of ready-made monitoring tools is realized uniformly and easily through a preset standard monitoring level (for example, refer to Patent Document 1).

As an integrated monitoring system that integrally monitors a plurality of systems, there exists a system that properly provides those who monitor the plurality of systems with information needed for each of them (for example, refer to Patent Document 2).

As an integrated operation management system in which a group of existing operation management tools is put together and integrated into one terminal device, there exists a system where operation management of the system is unified by allowing the group of existing operation management tools to function using an interface unified so as for an operating manager not to feel a difference in the operation procedure (for example, refer to Patent Document 3).

As a monitoring system for a distributed system, there exists a system that quickly collects urgent monitoring information without burdening a monitoring target system (for example, refer to Patent Document 4).

PRIOR ART DOCUMENTS

Patent Documents

Patent Document 1: Japanese Unexamined Patent Publication No. 2008-234351
Patent Document 2: Japanese Unexamined Patent Publication No. 2004-334576
Patent Document 3: Japanese Unexamined Patent Publication No. H06-301436
Patent Document 4: WO2008/117793

SUMMARY OF THE INVENTION

Problems to be Solved by the Invention

In the disclosure disclosed in Patent Document 1, each of decisions for monitoring levels in a plurality of subsystems is made using a preset standard monitoring level, so that a burden on an operating manager is reduced. However, there exists a problem in that derivation of synthetic status by synthesizing status of the plurality of subsystems is not intended. Note that, the synthetic status means integrated status information that is integrally monitored over at least two or more pieces of equipment from among status information of monitoring target functions in equipment.

The disclosure described in Patent Document 2 discloses a system that properly provides those who monitor a plurality of systems with information needed for each of them when the plurality of systems is integrally monitored. However, there exists a problem in that derivation of the synthetic status (integrated status information) for the systems is not intended.

In the disclosure disclosed in Patent Document 3, a group of existing operation management tools is put together and integrated into one terminal device and thus a unified interface is provided for an operating manager not to feel a difference in the operation procedure. However, there exists a problem in that derivation of the synthetic status (integrated status information) for the systems is not intended.

In the disclosure disclosed in Patent Document 4, urgent monitoring information is quickly collected. However, there exists a problem in that derivation of the synthetic status (integrated status information) for the systems is not intended.

The present disclosure is made to solve the above-described problems, and an object thereof is to obtain an integrated control device that, from among status information of monitoring target functions that is stored in monitoring data and is provided for each of a plurality of pieces of equipment to be monitored, assign a same attribute to a plurality of pieces of status information of monitoring target functions integrally monitored over at least two or more pieces of equipment and integrate the plurality of pieces of status information, to derive the integrated status information.

Means for Solving the Problems

An integrated control device according to the present disclosure can derive the integrated status information in such a manner that a group of pieces of preset status information is referenced with respect to a plurality of pieces of status information with a same attribute from among status information of monitoring target functions that is stored in monitoring data and is provided for each of a plurality of pieces of equipment to be monitored or an operation of applying an operator being set for each attribute to pieces of status information with a same attribute from among status information of monitoring target functions that is stored in monitoring data and is provided for each of a plurality of pieces of equipment to be monitored is carried out.

Effect of the Invention

According to the present disclosure, operation of equipment being monitoring targets can be managed regardless of the amount of status information of monitoring target functions in the equipment and without inviting a large increase in processing.

BRIEF DESCRIPTION OF THE DRAWINGS

FIG. 3A is a table showing preset status information and operators according to Embodiment 1 of the present disclosure.

FIG. 3B is a table showing preset status information and operators according to Embodiment 1 of the present disclosure.

FIG. 3C is a table showing preset status information and operators according to Embodiment 1 of the present disclosure.

FIG. 6A is a table showing preset status information and operators according to Embodiment 2 of the present disclosure.

FIG. 6B is a table showing preset status information and operators according to Embodiment 2 of the present disclosure.

FIG. 6C is a table showing preset status information and operators according to Embodiment 2 of the present disclosure.

FIG. 7 is a table showing preset status information according to Embodiment 3 of the present disclosure.

FIG. 8A is a table showing preset status information and operators according to Embodiment 4 of the present disclosure.

FIG. 8B is a table showing preset status information and operators according to Embodiment 4 of the present disclosure.

FIG. 9A is a table showing preset status information and operators according to Embodiment 4 of the present disclosure.

FIG. 9B is a table showing preset status information and operators according to Embodiment 4 of the present disclosure.

FIG. 9C is a table showing preset status information and operators according to Embodiment 4 of the present disclosure.

FIG. 10 is a table showing preset status information and operators according to Embodiment 5 of the present disclosure.

FIG. 11 is a table showing preset status information and operators according to Embodiment 6 of the present disclosure.

FIG. 12 is a table showing preset status information and operators according to Embodiment 7 of the present disclosure.

EMBODIMENT FOR CARRYING OUT THE INVENTION

Embodiment 1

Figure 1:
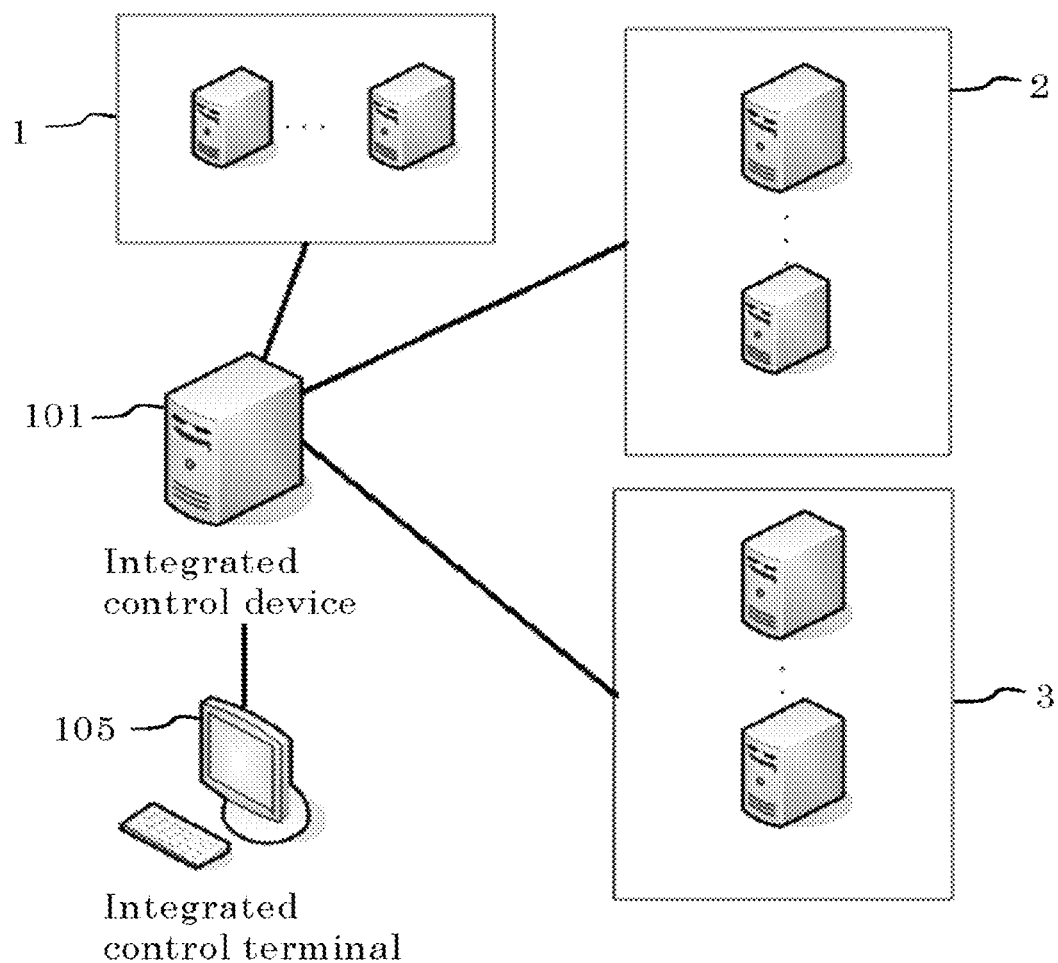
FIG. 1 is an entire system diagram showing an integrated control system according to Embodiment 1 of the present disclosure.
Figure 2:
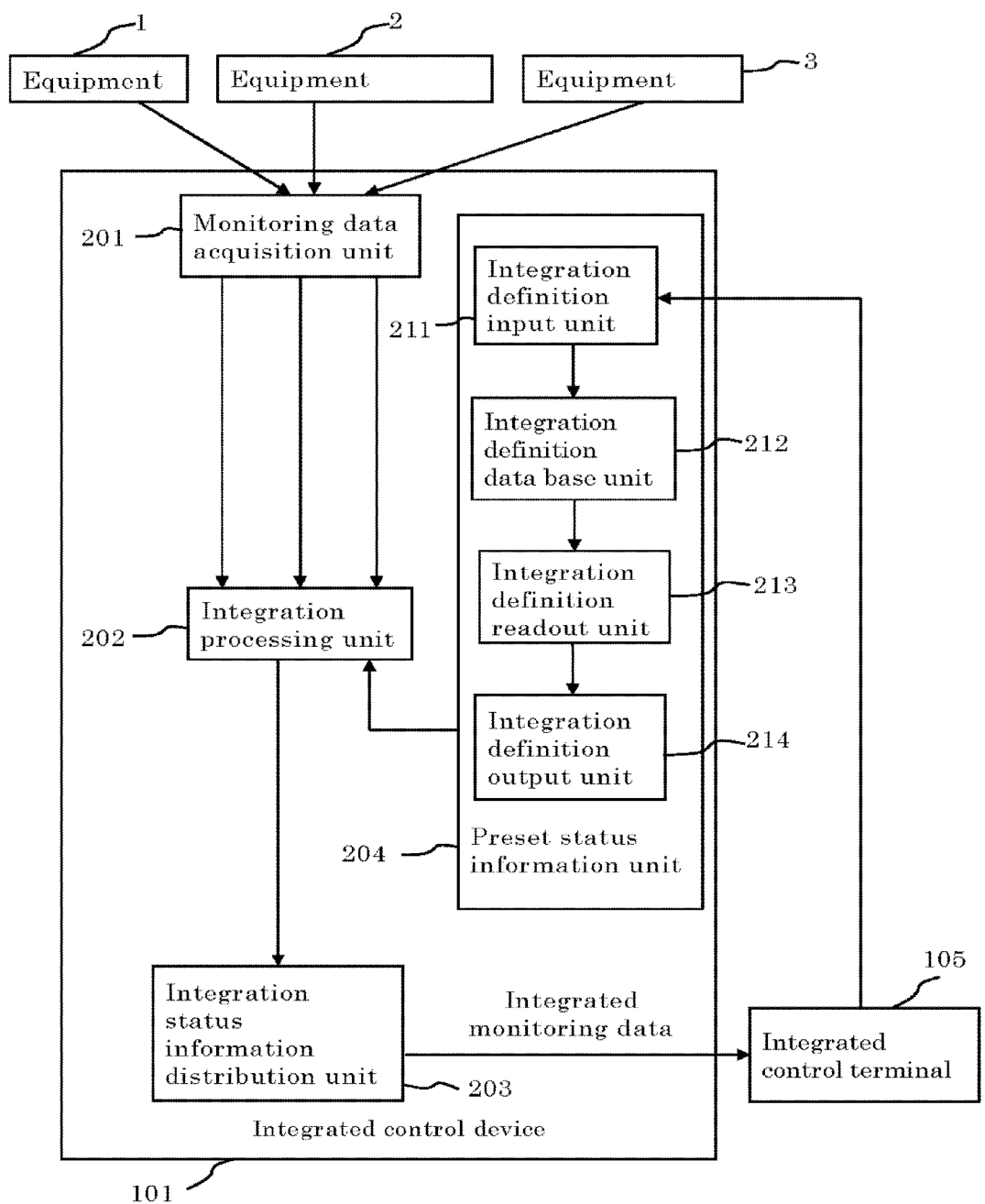
FIG. 2 is a functional block diagram of the integrated control system according to Embodiment 1 of the present disclosure.

With reference to FIG. 1, FIG. 2, and FIG. 3, an integrated control device and an integrated control system according to Embodiment 1 is described. An integrated control device 101 in FIG. 1 and FIG. 2 derives integrated status information in such a manner that a group of pieces of preset status information is referenced with respect to a plurality of pieces of status information with a same attribute from among status information of monitoring target functions that is stored in monitoring data and is provided for each of a plurality of pieces of equipment to be monitored (equipment 1, equipment 2, and equipment 3); or the integrated control device 101 derives the integrated status information in such a manner that an operation of applying an operator being set for each attribute to pieces of status information with a same attribute from among status information of monitoring target functions that is stored in monitoring data and is provided for each of a plurality of pieces of equipment to be monitored (equipment 1, equipment 2, and equipment 3) is carried out. The integrated control device according to Embodiment 1 corresponds to the integrated control device 101. In the monitoring data, status information of devices installed in the equipment being monitoring targets and status information of the equipment itself are stored. These pieces of the status information do not only indicate independent functions for each of pieces of the equipment. For example, in terms of a function that is needed to be managed together in three pieces of the equipment, i.e. the equipment 1, the equipment 2, and the equipment 3, each of pieces of the status information can be identified as the same attribute. As a way to identify whether the status information has the same attribute, distinguishable information could be added to the status information itself, or it could be identified by a type or content of the status information from the integrated control device 101 or later-described control devices. The integrated control device 101 derives the integrated status information by integrating these pieces of the status information with the same attribute. The integrated control device 101 may be configured with a computer such as a workstation or a server. In this case, process operation and control of the integrated control device 101 according to the present application, i.e. each of "process steps" that is operation of each of constituents in the integrated control device 101 is easily performed by a program. The constituents of integrated control device 101 are a monitoring data acquisition unit 201, an integration processing unit 202, an integration status information distribution unit 203, and a preset status information unit 204 that are described later.

A term "integration" used in the present application does not mean that the status information with the same attribute is simply synthesized, but it means that the status information being integrated information is derived from the status information with the same attribute on the basis of a rule predetermined for each same attribute. The derived status information is called as the integrated status information (synthetic status). For example, it is assumed that a function is realized by cooperatively operating the equipment 1, the equipment 2, and the equipment 3 with each other. In this case, the predetermined rule is that the integrated control device 101 is not allowed to determine the cooperated function to be in a standby state unless the status information (of the same attribute) of monitoring target functions in the equipment is all in a standby state. In other words, when the status information (stored in the monitoring data) which is transmitted from the equipment 1, the equipment 2, and the equipment 3 and has the same attribute for identifying the function cooperated is all in a standby state, the integrated control device 101 determines that the integrated status information is in a standby state. In contrast, when any one from among the pieces of status information (stored in the monitoring data) that is transmitted from the equipment 1, the equipment 2, and the equipment 3 and has the same attribute for identifying the function cooperated is not in a standby state, the integrated control device 101 determines that the integrated status information is not in a standby state. This is an example of the predetermined rule. The predetermined rule is described in detail later on.

Although, in FIG. 1 and FIG. 2, three pieces of the equipment, i.e. the equipment 1, the equipment 2, and the equipment 3, are shown as the plurality of pieces of equipment being monitoring targets, the number of pieces of the equipment should be two or more. The integrated control device 101 that is connected to each of the equipment 1, the equipment 2, and the equipment 3 through a LAN (Local Area Network) or a WAN (Wide Area Network) is shown as an example. Needless to say, the LAN or the WAN may be wired or wireless. In addition, another communication means may be applicable. FIG. 1 and FIG. 2 show a case where the integrated control device 101 receives respective pieces of the monitoring data (status information) from the equipment 1, the equipment 2, and the equipment 3 through the LAN or the WAN. The control devices may be disposed between the integrated control device 101 and each of the equipment 1, the equipment 2, and the equipment 3, so that the integrated control device 101 receives the monitoring data (status information) of the equipment 1, the equipment 2, and the equipment 3 through the control devices. In other words, the equipment 1, the equipment 2, and the equipment 3 shown in FIG. 1 and FIG. 2 can be replaced with a control device 1, a control device 2, and a control device 3. This case means that the illustration of the equipment 1 connected to the control device 1 is omitted, and the same applies to the equipment 2 and the equipment 3. The control device 1, the control device 2, and the control device 3 monitor and control operation of the equipment 1, the equipment 2, and the equipment 3, respectively. Such a control device and a piece of the equipment may be united.

In FIG. 1 and FIG. 2, an integrated control terminal 105 includes a display unit in which at least the integrated status information derived by the integrated control device 101 is displayed. Naturally, it may display the status information (monitoring data) of the plurality of pieces of equipment (equipment 1, equipment 2, and equipment 3) before the integration thereof. The integrated control device 101 and the integrated control terminal 105 may be united. The monitoring data acquisition unit 201 obtains the monitoring data from each of the plurality of equipment (equipment 1, equipment 2, and equipment 3).

Referring to a group of pieces of preset status information formed by preset status information set for each of combinations of pieces of the status information with the same attribute, the integration processing unit 202 determines a piece of the preset status information corresponding to a combination of pieces of the status information with the same attribute being stored in the monitoring data obtained by the monitoring data acquisition unit 201. The integration processing unit 202 treats the determined preset status information as the integrated status information. The above-described predetermined rule corresponds to the group of pieces of preset status information. The preset status information unit 204 provides the integration processing unit 202 with the group of pieces of preset status information in accordance with an instruction from the integration processing unit 202. Naturally, the integration processing unit 202 may refer to the group of pieces of preset status information stored in the preset status information unit 204. The integration status information distribution unit 203 receives the integrated status information derived in the integration processing unit 202 and distributes integrated monitoring data such as the integrated status information to the integrated control terminal 105.

The integrated control system according to Embodiment 1 includes the equipment 1 (control device 1), the equipment 2 (control device 2), and the equipment 3 (control device 3) in addition to the integrated control device 101 shown in FIG. 1 and FIG. 2. That is, the integrated control system according to Embodiment 1 is configured with the plurality of pieces of equipment being monitoring targets and the integrated control device 101. Further, a case may also be included where the integrated control system according to Embodiment 1 is configured with a plurality of control device connected to one or more of a plurality of pieces of equipment being monitoring targets, and the integrated control device 101. In addition, another case may also be included where the integrated control system according to Embodiment 1 is configured with a plurality of pieces of equipment being monitoring targets, a plurality of control device that is connected to one or more of a plurality of pieces of equipment being monitoring targets, and the integrated control device 101.

Next, operation of the integration processing unit 202 is described with reference to FIG. 3. Here, a case where the equipment 1 and the equipment 2 are connected to the integrated control device 101 is described as an example. That is, it is a case where the number of the plurality of pieces of equipment being monitoring targets is two. The monitoring data acquisition unit 201 obtains monitoring data A from the equipment 1 and monitoring data B from the equipment 2. Three examples of the group of pieces of preset status information described above are shown as tables in FIG. 3A, FIG. 3B, and FIG. 3C.

Information indicated as "OK" or "NG" in FIG. 3 is the status information with the same attribute stored in the monitoring data A and the monitoring data B. In a case where the table shown in FIG. 3A is used as the group of pieces of preset status information, the integrated status information results in "OK" only when both pieces of the status information of the equipment 1 and the equipment 2 are "OK". That is, a logical operator "AND" is written as an operator in FIG. 3A, and it means that the table shown in FIG. 3A is created using the operator.

In a case where the table shown in FIG. 3B is used as the group of pieces of preset status information, the integrated status information results in "OK" when at least one of the pieces of the status information of the equipment 1 and the equipment 2 is "OK". That is, a logical operator "OR" is written as an operator in FIG. 3B, and it means that the table shown in FIG. 3B is created using the operator. An explanation for an area surrounded by double lines in the table shown in FIG. 3B is provided later on. In a case where the table shown in FIG. 3C is used as the group of pieces of preset status information, the integrated status information results in "OK" when at least one of the pieces of the status information of the equipment 1 and the equipment 2 is "NG". That is, a logical operator "NOR" is written as an operator in FIG. 3C, and it means that the table shown in FIG. 3C is created using the operator.

In Embodiment 1, an explanation is provided for an example in which there are three groups of the preset status information as shown in FIG. 3A, FIG. 3B, and FIG. 3C. In other words, an explanation is provided for an example in which three attributes of the status information exist.

The integration processing unit 202 extracts the status information with the same attribute from the monitoring data A and the monitoring data B obtained by the monitoring data acquisition unit 201. The extraction is performed for each attribute. Note that, regarding the extraction of the status information from the monitoring data, the status information may be extracted by the monitoring data acquisition unit 201 and then sent to the integration processing unit 202. Further, in a case where the control device 1 is interposed between the equipment 1 and the integrated control device 101, and the control device 2 is interposed between the equipment 2 and the integrated control device 101, the control device 1 and the control device 2 may extract the status information with the same attribute from the monitoring data A and the monitoring data B, respectively. That is, the monitoring data acquisition unit 201 directly obtains the status information. In the present application, although it is described that the monitoring data acquisition unit 201 obtains the monitoring data, the monitoring data does not only mean monitoring data before the extraction of the status information. That is, the monitoring data obtained by the monitoring data acquisition unit 201 has two meanings in the present application. It means the monitoring data itself from which the status information is extracted, or it means combinations of pieces of the status information extracted from the monitoring data. That is, the status information or the status information of the monitoring data means both the status information stored in the monitoring data and a bunch of pieces of the status information originated and extracted from the monitoring data. Naturally, the monitoring data itself may be called as the status information.

The integration processing unit 202 refers to the group of pieces of preset status information formed by the preset status information set for each of the combinations of pieces of the status information with the same attribute. The group of pieces of preset status information is held in the preset status information unit 204 as previously described. The integration processing unit 202 determines a group of pieces of preset status information corresponding to combinations of pieces of the status information with a same attribute. Here, an explanation is provided for a case where the group of pieces of preset status information corresponding to the same attribute of the status information obtained from the monitoring data A and the monitoring data B is given in the table shown in FIG. 3A. That is, the status information (originated from monitoring data A) and the status information (originated from monitoring data B) are either "OK" or "NG". The situation where the status information is either "OK" or "NG" also applies to the table shown in FIG. 3B and the table shown in FIG. 3C.

If a combination of two pieces of the status information, i.e. the status information (originated from monitoring data A) and the status information (originated from monitoring data B), corresponds to the combination of "OK" and "OK", the preset status information results in "OK" on the basis of the table shown in FIG. 3A. If a combination of the two pieces corresponds to the combination of "OK" and "NG", the preset status information results in "NG" on the basis of the table shown in FIG. 3A. If a combination of the two pieces corresponds to the combination of "NG" and "OK", the preset status information results in "NG" on the basis of the table shown in FIG. 3A. If a combination of the two pieces corresponds to the combination of "NG" and "NG", the preset status information results in "NG" on the basis of the table shown in FIG. 3A. The integration processing unit 202 treats the preset status information thus determined as the integrated status information.

In a case where the integrated status information is derived using the groups of the preset status information shown in FIG. 3, the integration processing unit 202 converts the status information of the monitoring data into a truth value, or the monitoring data acquisition unit 201 obtains the status information of the monitoring data expressed by the truth value. Using the status information being the truth value thus obtained, the integration processing unit 202 derives the integrated status information. In this case, it can be said that the integration processing unit 202 refers to the preset status information that is set in association with a logical operation result obtained by applying a logical operator being set for each attribute to a combination of pieces of the status information with the same attribute. Naturally, the preset status information may be prepared using an arithmetic operator other than the logical operator being set for each attribute. The arithmetic operator means a mathematical operator. The arithmetic operator includes an operator of the four arithmetic operations and an operator of an inequality sign.

In a case where the group of pieces of preset status information is obtained using the arithmetic operator being set for each attribute, the integration processing unit 202 converts the status information of the monitoring data into a numerical value, or the monitoring data acquisition unit 201 obtains the status information of the monitoring data expressed by the numerical value. Using the status information being the numerical value thus obtained, the integration processing unit 202 derives the integrated status information. In this case, it can be said that the integration processing unit 202 refers to the group of pieces of preset status information that is set in association with an arithmetic operation result obtained by applying an arithmetic operator being set for each attribute with respect to each of the combinations of pieces of the status information with the same attribute. The arithmetic operator here may be an operator using an inequality sign in addition to the operators of the four arithmetic operations. In this case, it can be said that the integration processing unit 202 refers to the preset status information that is set in association with an arithmetic operation result obtained by applying an arithmetic operator being set for each attribute to a combination of pieces of the status information with the same attribute.

FIG. 2 shows a case where the preset status information unit 204 is constituted by an integration definition input unit 211 that receives, from the integrated control terminal 105, an integration definition setting of the monitoring data (status information), an integration definition data base unit 212 in which a group of pieces of preset status information (table) created on the basis of an integration definition inputted is stored, an integration definition readout unit 213 which reads out, from the integration definition data base unit 212, the group of pieces of preset status information formed by the preset status information set for each of combinations of pieces of the status information with the same attribute, and an integration definition output unit 214 that outputs, to the integration processing unit 202, the group of pieces of preset status information read out.

When the integrated control device 101 obtains the monitoring data from the equipment (equipment 1, equipment 2, and equipment 3), the following three cases in the means can be mainly considered. The first of them is the case where the integrated control device 101 instructs the equipment to transmit the monitoring data (status information) as necessary. This includes a case where the control devices (control device 1, control device 2, and control device 3) act for the integrated control device 101. The second is the case where the equipment or the control device transmits the monitoring data (status information) to the integrated control device 101 at every predetermined time. The third is the case where the equipment or the control device transmits the monitoring data (status information) to the integrated control device 101 whenever a change in the monitoring data of the equipment occurs. These three cases in the means may be combined with each other.

It frequently happens that timing at which the monitoring data (status information) is obtained from the plurality of pieces of equipment being monitoring targets is different for each of pieces of the equipment. Thus, there is a case where corresponding preset status information cannot be selected from the group of pieces of preset status information until all pieces of the status information with the same attribute are collected. In this case, processing takes much time. In contrast, even when there exist status information that is not inputted, there is a case where content of the preset status information can be determined by content of not all pieces of, but at least one or more pieces of the status information. For example, this corresponds to a table (group of pieces of preset status information) shown in FIG. 3B. The table in FIG. 3B shows that any pieces of the preset status information having at least any one of pieces of the status information with the same attribute being "OK" result in "OK".

That is, in the case of the table shown in FIG. 3B, when the status information being "OK" is obtained, the integration processing unit 202 can determine the preset status information to derive the integrated status information. Thus, the status information can be derived quickly. This can be easily performed by preparing, in the preset status information unit 204, such preset status information shown in the area surrounded by double lines in the table of FIG. 3B. In a case where the integrated status information cannot be determined, corresponding preset status information is newly selected from the group of pieces of preset status information when status information that is not inputted is obtained.

Here, an explanation is provided for a case, as an example, where there exists status information that is not inputted. However, in a case where the integrated status information is newly derived when the status information transmitted sequentially is changed from the preceding one, the same processing in that the status information that is not inputted is considered to be preceding status information inputted may be performed. In the table (group of pieces of preset status information), it may be not stated as "not inputted", but stated as "preceding input".

It can be said that, even in the case where the content of the preset status information can be determined by the content of one piece of status information, processing is performed in the integration processing unit 202 for determining a piece of preset status information corresponding to a combination of pieces of status information with the same attribute being stored in the monitoring data obtained by the monitoring data acquisition unit. That is, in the present application, a combination of pieces of status information with the same attribute is not only for the case where the number of the status information is two or more. That is, in the case where the content of the preset status information is determined by the content of one piece of status information, the status information in the combination of pieces of status information with the same attribute means the one piece of status information. Further, in the case where the content of the preset status information is determined by the content of one piece of status information, it can also be said that the status information in the combination of pieces of status information with the same attribute means a combination of one piece of status information and the status information that is not inputted (preceding status information inputted).

Thus far, an explanation is mainly provided for a case where, when deriving the integrated status information, the integrated control device and the integrated control system according to Embodiment 1 perform processing in which the preset status information associated with corresponding status information from among the group of pieces of preset status information (table) stored in the preset status information unit 204 is treated as the integrated status information. Next, an explanation is provided for a case where the integrated control device and the integrated control system according to Embodiment 1 derive the integrated status information in such a manner that an operation of the status information with the same attribute being stored in the monitoring data obtained by the monitoring data acquisition unit 201 is carried out using an operator set for each attribute. In this case, the operator set for each attribute is stored in the preset status information unit 204. Using the operator set for each attribute, the integration processing unit 202 carries out an operation of the status information with the same attribute stored in the monitoring data obtained by the monitoring data acquisition unit and treats the operation result as the integrated status information, or using the operator set for each attribute, the integration processing unit 202 carries out an operation of the status information with the same attribute stored in the monitoring data obtained by the monitoring data acquisition unit and treats information associated beforehand with the operation result as the integrated status information.

The preset status information unit 204 provides the operator set for each attribute to the integration processing unit 202 in accordance with an instruction from the integration processing unit 202. Naturally, the integration processing unit 202 may refer to the operator that is set for each attribute and stored in the preset status information unit 204.

In a case where the operator that the integration processing unit 202 uses in deriving the integrated status information is the logical operator set for each attribute of the status information, the processing is performed as follows. The integration processing unit 202 converts the status information of the monitoring data into a truth value, or the monitoring data acquisition unit 201 obtains the status information of the monitoring data expressed by the truth value. With respect to the status information being the truth value thus obtained, the integration processing unit 202 carries out a logical operation using the logical operator set for each attribute, and the result of logical operation is treated as the integrated status information, or the integration processing unit 202 treats information associated beforehand with the result of logical operation using the logical operator set for each attribute as the integrated status information.

In a case where the operator that the integration processing unit 202 uses in deriving the integrated status information is the arithmetic operator set for each attribute of the status information, the processing is performed as follows. The integration processing unit 202 converts the status information of the monitoring data into a numerical value, or the monitoring data acquisition unit 201 obtains the status information of the monitoring data expressed by the numerical value. With respect to the status information being the numerical value thus obtained, the integration processing unit 202 carries out an arithmetic operation using the arithmetic operator set for each attribute, and the result of arithmetic operation is treated as the integrated status information, or the integration processing unit 202 treats information associated beforehand with the result of arithmetic operation using the arithmetic operator set for each attribute as the integrated status information. The arithmetic operator here may be an operator using an inequality sign in addition to the operators of the four arithmetic operations. In this case, the integration processing unit 202 treats the result of arithmetic operation using the inequality sign set for each attribute as the integrated status information, or the integration processing unit 202 treats information associated beforehand with the result of arithmetic operation using the inequality sign set for each attribute as the integrated status information.

When the integrated control device and the integrated control system according to Embodiment 1 derive the integrated status information, an operation of the status information with the same attribute being stored in the monitoring data obtained by the monitoring data acquisition unit 201 is carried out, and in this case, constitution of the preset status information unit 204 is as follows. The preset status information unit 204 is constituted by the integration definition input unit 211 that receives, from the integrated control terminal 105, the integration definition setting of the monitoring data (status information), the integration definition data base unit 212 in which an operator created on the basis of an integration definition inputted and set for each attribute is stored, the integration definition readout unit 213 which reads out, from the integration definition data base unit 212, the operator set for each of the combinations of pieces of the status information with the same attribute, and the integration definition output unit 214 that outputs, to the integration processing unit 202, the operator read out.

Similar to the case where the integrated status information is derived using the group of pieces of preset status information (table), it frequently happens that timing at which the monitoring data (status information) is obtained from the plurality of pieces of equipment being monitoring targets is different for each of pieces of the equipment. Thus, there are cases where the integrated status information cannot be calculated using the operator set for each attribute until all pieces of the status information with the same attribute are collected. In this case, processing takes much time. In contrast, when there exist status information that is not inputted, there is an operator by which the integrated status information can be calculated (derived) from content of not all pieces of, but at least one or more pieces of the status information. For example, this corresponds to the case where the operator set for each attribute is the logical operator "OR". When at least any one of pieces of the status information is "OK", any operation results of the logical operator OR are obtained to be "OK". That is, in the case where the operator set for each attribute is the logical operator "OR", the integration processing unit 202 can derive the integrated status information when status information being "OK" is obtained, or the integration processing unit 202 can derive information associated beforehand with a result of the logical operation as the integrated status information when the status information being "OK" is obtained. Here, an explanation is provided for a case, as an example, where there exists status information that is not inputted. However, in a case where the integrated status information is newly derived when the status information transmitted sequentially is changed from the preceding one, the same processing in that the status information that is not inputted is considered to be the processing status information inputted may be applied to the status information after the change.

Next, an explanation is provided for a case where processing of the integration processing unit 202 in the integrated control device (integrated control system) according to Embodiment 1 is performed by a program. In this case, at least the integration processing unit 202 is configured with a computer. A program that performs the processing of the integration processing unit 202 is called an integrated control program. The integrated control program according to Embodiment 1 causes the computer (integration processing unit 202) to derive the integrated status information by assigning, from among status information of monitoring target functions that is stored in monitoring data and is provided for each of a plurality of pieces of equipment to be monitored, the same attribute to plurality of pieces of the status information of monitoring target functions integrally monitored over at least two or more pieces of equipment, and by integrating, for each attribute, the plurality of pieces of status information of monitoring target functions.

Next, an explanation for the integrated control program according to Embodiment 1 is provided in the following two cases. These cases each correspond to processing of the integration processing unit 202 in the integrated control device (integrated control system) according to Embodiment 1. The former part of the processing and the latter part of the processing of the integrated control program according to Embodiment 1 is the same as the former part of the processing and the latter part of the processing in the integration processing unit 202 in the integrated control device (integrated control system) according to Embodiment 1. That is, in the two cases in the integrated control program according to Embodiment 1 for which an explanation is provided, basic operation (processing step) of the former part of the processing and the latter part of the processing in the integration processing unit 202 is common.

The first case is that, when the integrated status information is derived, processing is performed in which a piece of preset status information associated with corresponding status information from among the group of pieces of preset status information (table) stored in the preset status information unit 204 is treated as the integrated status information. In this case, as processing steps of the integrated control program, a reference step, a determination step of the preset status information, a determination step of the integrated status information are performed by the computer. An explanation is provided for the second case where the integrated status information is derived by carrying out an operation of the status information with the same attribute being stored in the monitoring data obtained by the monitoring data acquisition unit 201. In this case, as processing steps of the integrated control program, an operation step and a determination step of the integrated status information are performed by the computer.

First, the integrated control program that causes the computer to perform the reference step, the determination step of the preset status information, and the determination step of the integrated status information is described. In the reference step, the group of pieces of preset status information formed by the preset status information set for each of the combinations of pieces of the status information with the same attribute is referred to. In the determination step of the status information, determined is a piece of the preset status information corresponding to a combination of pieces of the status information with the same attribute being stored in the monitoring data obtained from each of the plurality of equipment. Further, in the determination step of the integrated status information, the preset status information determined in the determination step of the preset status information is treated as the integrated status information. In the reference step, referred is the preset status information that is set in association with an operation result obtained by applying an arithmetic operator being set for each attribute to a combination of pieces of the status information with the same attribute. Here, the operator means the logical or the arithmetic operator described above.

Next, an explanation is provided for the integrated control program that causes the computer to perform the operation step and the determination step of the integrated status information. In the operation step, using an operator set for each attribute, an operation of the status information with the same attribute being stored in the monitoring data obtained from each of the plurality of equipment is carried out. In the determination step of the integrated status information, the operation result in the operation step is treated as the integrated status information, or information associated beforehand with the operation result in the operation step is treated as the integrated status information. Here, the operator means the logical or the arithmetic operator described above.

In Embodiment 2 and subsequent embodiments, although the detail of the integrated control program is not described, the program performs each "processing step" being operation of each constituent in the integrated control device 101. Further, also in the integrated control program according to Embodiment 1, in a case where the integrated status information can be derived from content of not all pieces of, but at least one or more pieces of the status information when there exists status information that is not inputted, the processing can be quickly performed. This includes a case where the status information is not the one that is not inputted, but is preceding status information inputted. For more details, the same processing in the integrated control program according to Embodiment 1 as that of the integrated control device and the integrated control system according to Embodiment 1 is performed in the determination step of the preset status information or the operation step.

As examples that can be given for the plurality of equipment in the integrated control system according to Embodiment 1, the plurality of equipment (equipment 1, equipment 2, and equipment 3) are any of a satellite, a mission facility for a satellite (including ground facility for mission), and a ground station for a satellite in a satellite control system, the plurality of equipment (equipment 1, equipment 2, and equipment 3) each are constituents for a collision-avoidance radar for an automobile, and the plurality of equipment (equipment 1, equipment 2, and equipment 3) are a plurality of generators for photovoltaic power generation. Note that, the monitoring data acquisition unit 201 may obtain the monitoring data from the plurality of equipment (equipment 1, equipment 2, and equipment 3) through control devices that monitor or control operation of the equipment.

In Embodiment 2 and subsequent embodiments, an explanation is provided, as an example, for a case where the plurality of pieces equipment (equipment 1, equipment 2, and equipment 3) in the integrated control system are any of a satellite, a mission facility for a satellite, and a ground station for a satellite. Naturally, the integrated control device and the integrated control system according to Embodiment 1 are applicable to a system in which the integrated status information is derived by assigning, from among status information of monitoring target functions that is stored in monitoring data and is provided for each of a plurality of pieces of equipment to be monitored, the same attribute to the plurality of pieces of status information of monitoring target functions integrally monitored over at least two or more pieces of equipment, and integrating, for each attribute, the plurality of pieces of status information of monitoring target functions. For example, in the case of a collision-avoidance radar for an automobile, the plurality of equipment are assumed to be equipment that calculates velocity and equipment that derives distance to an object (object with which collision is avoided). Pieces of status information of monitoring target functions are the velocity of the automobile and the distance between the automobile and the object. In the case where a plurality of generators for photovoltaic power generation are the plurality of equipment, status information of monitoring target functions is phase information of electricity generated by each generator. It is noted that descriptions in Embodiment 1 common with those in Embodiment 2 and subsequent embodiments is omitted in some cases.

Note that, in Embodiment 2 to Embodiment 7, examples in terms of derivation of integrated status information using a group of pieces of preset status information (table) are described. Thus, similar to Embodiment 1, derivation of the integrated status information using an operator set for each same attribute may be performed. Specifically, similar to Embodiment 1, operators listed in groups of preset status information (table) that is used in Embodiment 2 to Embodiment 7 is employed.

Embodiment 2

Figure 4:
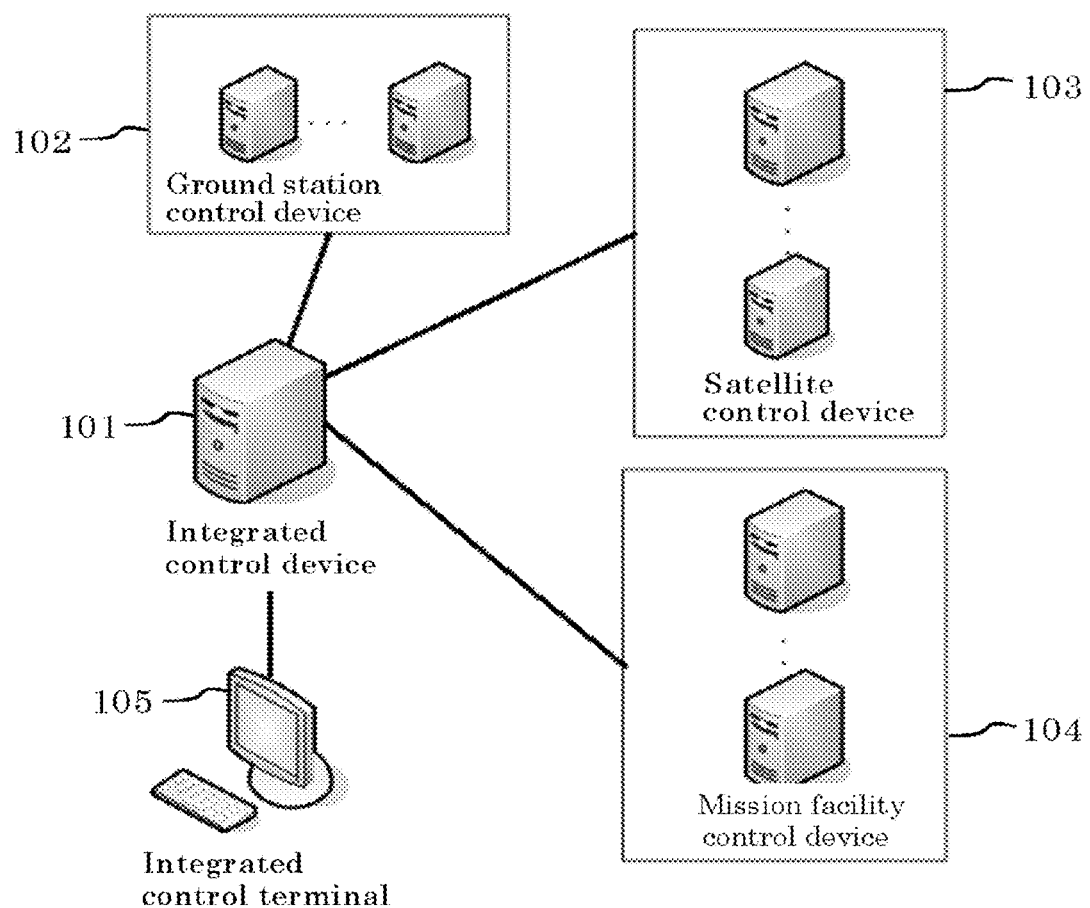
FIG. 4 is an entire system diagram showing an integrated control system according to Embodiment 2 of the present disclosure.

FIG. 4 is an entire system diagram showing an integrated control system according to Embodiment 2 of the present disclosure. It is shown in FIG. 4 that a ground station 12 (earth station 12), a satellite 13, and a mission facility 14 (corresponding to equipment 1, equipment 2, and equipment 3 in Embodiment 1) are connected to the integrated control device 101 through a ground station control device 102 (earth station control device 102), a satellite control device 103, and a mission facility control device 104 (corresponding to control device 1, control device 2, and control device 3 in Embodiment 1), respectively. The ground station 12, the satellite 13, and the mission facility 14 are omitted for simplicity in FIG. 4.

In FIG. 4, the integrated control system 11 includes the satellite control device 103, the mission facility control device 104, the ground station control device 102, the integrated control device 101, and the integrated control terminal 105. The satellite control device 103 monitors the satellite 13 (status monitoring) by receiving monitoring data of the satellite 13. The mission facility control device 104 monitors success and failure of a mission by receiving monitoring data of the mission facility 14. The ground station control device 102 performs status monitoring of the ground station by receiving monitoring data of the ground station 12 for the satellite. That is, the satellite control device 103 is a control device for monitoring and controlling operation of the satellite 13. The mission facility control device 104 is a control device for monitoring and controlling operation of the mission facility 14. The ground station control device 102 is a control device for monitoring and controlling operation of the ground station 12.

In FIG. 4, the integrated control device 101 assigns, from among status information of monitoring target functions that is provided for each of plurality of pieces of equipment and is each stored in monitoring data being satellite monitoring data from the satellite control device 103, mission facility monitoring data from the mission facility control device 104, and ground station monitoring data from the ground station control device 102, the same attribute to the plurality of pieces of status information of monitoring target functions integrally monitored over at least two or more pieces of equipment. Here, the pieces of equipment are the satellite 13, the mission facility 14, and the ground station 12. Then, the integrated control device 101 derives integrated status information by integrating, for each attribute, the plurality of pieces of status information of monitoring target functions. Specifically, the integrated control device 101 integrates the plurality of pieces of status information with the same attribute using a predetermined group of pieces of preset status information (table) to create the integrated status information of the satellite 13, the mission facility 14, and the ground station 12, or the integrated control device 101 integrates the status information with the same attribute using an operator to create the integrated status information of the satellite 13, the mission facility 14, and the ground station 12. The integrated control terminal 105 displays integrated monitoring data such as the integrated status information.

Similar to the equipment and the integrated control device 101 in the embodiment, the integrated control device 101 is connected to the satellite control device 103, the mission facility control device 104, and the ground station control device 102 through a LAN or a WAN, and the integrated control device 101 is connected to the integrated control terminal 105 through the LAN or the WAN.

Figure 5:
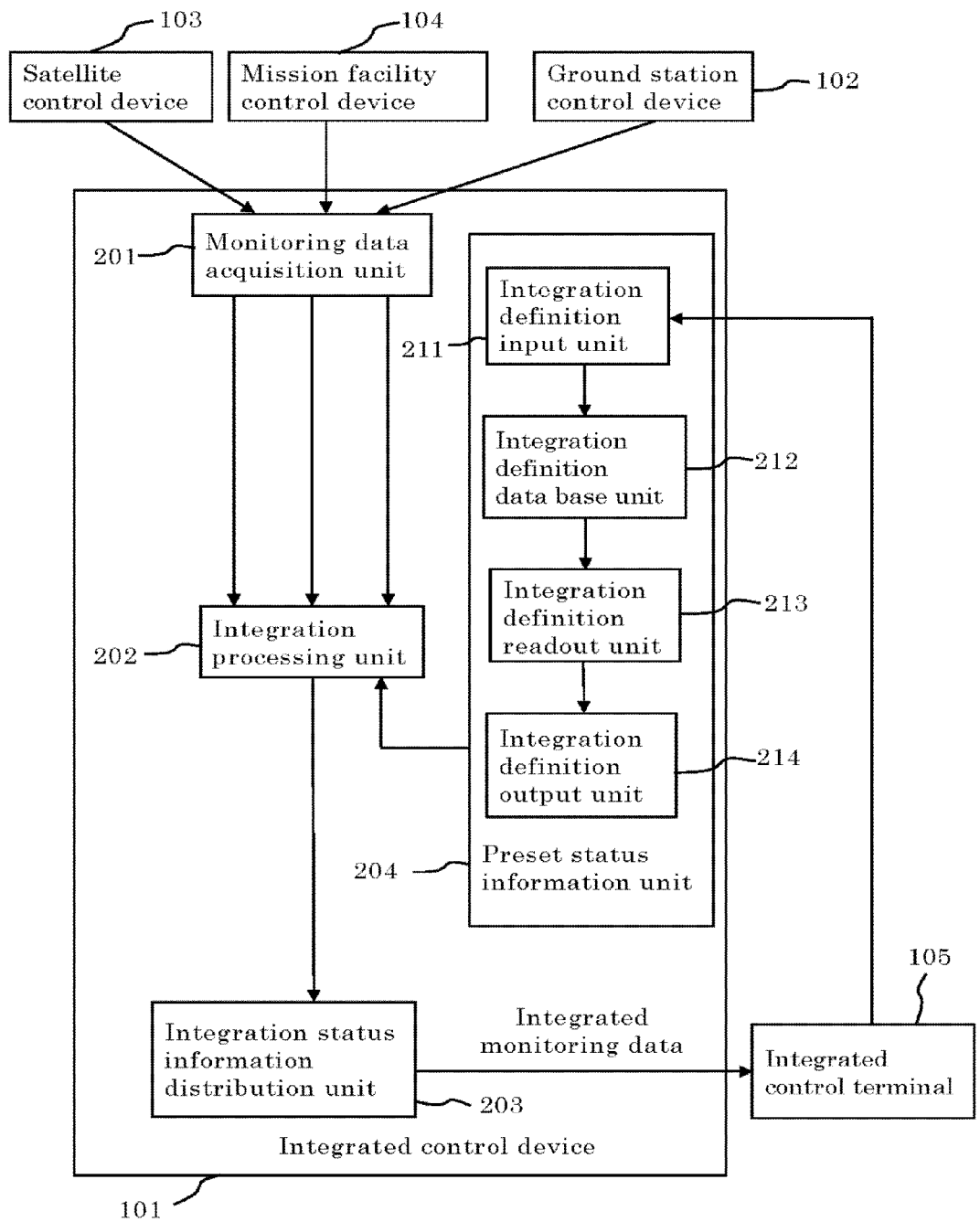
FIG. 5 is a functional block diagram of the integrated control system according to Embodiment 2 of the present disclosure.

FIG. 5 is a functional block diagram of the integrated control system according to Embodiment 2 of the present disclosure. Similar to FIG. 4, it is shown in FIG. 5 that the ground station 12, the satellite 13, and the mission facility 14 are connected to the integrated control device 101 through the ground station control device 102, the satellite control device 103, and the mission facility control device 104, respectively. The ground station 12, the satellite 13, and the mission facility 14 are omitted for simplicity also in FIG. 5.

In FIG. 5, the integrated control device 101 includes the preset status information unit 204, the monitoring data acquisition unit 201, the integration processing unit 202, and the integration status information distribution unit 203. In the preset status information unit 204, a group of pieces of preset status information (table) or an operator is stored. The monitoring data acquisition unit 201 receives monitoring data such as the satellite monitoring data, the mission facility monitoring data, and the ground station monitoring data. The integration processing unit 202 obtains each of pieces of the monitoring data, i.e. the satellite monitoring data, the mission facility monitoring data, and the ground station monitoring data that are received by the monitoring data acquisition unit 201. The integration processing unit 202 may obtain status information extracted from each of pieces of the monitoring data. The group of pieces of preset status information (table) stored in the preset status information unit 204 or the operator stored in the preset status information unit 204 is inputted to the integration processing unit 202. The integration processing unit 202 integrates, in accordance with the group of pieces of preset status information (table) inputted or the operator inputted, status information with the same attribute in each of pieces of the monitoring data, i.e. the satellite monitoring data, the mission facility monitoring data, and the ground station monitoring data that are received by the monitoring data acquisition unit 201, to create the integrated status information. The integration status information distribution unit 203 receives the integrated status information created by the integration processing unit 202 and distributes the integrated status information to the integrated control terminal 105.

FIG. 5 shows a case where the preset status information unit 204 is constituted by the integration definition input unit 211 that receives, from the integrated control terminal 105, an integration definition setting of the monitoring data (status information), the integration definition data base unit 212 in which the group of pieces of preset status information (table) created on the basis of an integration definition inputted is stored, the integration definition readout unit 213 which reads out, from the integration definition data base unit 212, the group of pieces of preset status information unit 212 formed by preset status information set for each of the combinations of pieces of the status information with the same attribute, and the integration definition output unit 214 that outputs, to the integration processing unit 202, the group of pieces of preset status information.

Operation of the integrated control system according to Embodiment 2 is described. An example is described in which the same attribute is assigned to the plurality of pieces of status information of monitoring target functions integrally monitored over the satellite 13 and the ground station 12 from among the plurality of pieces of status information of monitoring target functions in the satellite 13 and the ground station 12 that is stored in the monitoring data in the satellite 13 and the ground station 12, and the status information of monitoring target functions is integrated for each attribute.

Integrated status information C that is newly created as the status information by integrating, for each attribute, the status information of monitoring target functions of the satellite 13 and the ground station 12 is created from the status information of the satellite 13 (originated from monitoring data A) and the status information of the ground station 12 (originated from monitoring data B) using logical operators (AND, OR, NOR), arithmetic operators (+, −, ÷, ×, =, ≠), and inequality signs (≥, >, ≤, <). Definition setting information for the creation is prepared in the preset status information unit 204 in advance.

It is assumed that the status information of the satellite 13 (originated from monitoring data A) is set to "OK" when a prescribed bit is zero, and the status information is set to "NG" when the bit is one. It is assumed that the status information of the ground station 12 (originated from monitoring data B) is set to "OK" when a prescribed bit is zero, and the status information is set to "NG" when the bit is one.

In Case 1a, when "Data A:OK AND Data B=OK=Data C=OK" as a logical expression is inputted from the integrated control terminal 105 to the integration definition input unit 211, a table for a group of pieces of preset status information shown in FIG. 6A is created in the integration definition data base unit 212. In the following, when the number of types of the monitoring data is two, the table for the group of pieces of preset status information is called as the table for integrated status information C. When the number of types of the monitoring data is four, the table for the group of pieces of preset status information is called as the table for integrated status information E.

In Case 1b, when "Data A:OK OR Data B:OK=Data C:OK" as a logical expression is inputted from the integrated control terminal 105 to the integration definition input unit 211, a table for the integrated status information C shown in FIG. 6B is created in the integration definition data base unit 212. An explanation for an area surrounded by double lines in the table shown in FIG. 6B is provided later on.

In Case 1c, when "Data A:OK NOR Data B:OK=Data C:NG" as a logical expression is inputted from the integrated control terminal 105 to the integration definition input unit 211, a table for the integrated status information C shown in FIG. 6C is created in the integration definition data base unit 212.

In accordance with a monitoring level of the integrated control system, the integration definition readout unit 213 reads out, from the integration definition data base unit 212, any one of the tables of integrated status information C from Case 1a (FIG. 6A) to Case 1c (FIG. 6C), and outputs the table to the integration definition output unit 214. Case 1a, Case 1b, and Case 1c are set each for the status information (same attribute) integrally monitored over at least two or more pieces of the equipment as described in Embodiment 1. In other words, FIG. 6 corresponds to a case where there exist three attributes. The monitoring level is used to determine the type and the number of pieces of the status information integrally monitored over at least two or more pieces of the equipment. For example, it is thought that the number of types and pieces of integrally monitored status information increases as the monitoring level increases.

The status information of the satellite (originated from monitoring data A) and the status information of the ground station (originated from monitoring data B) received by the monitoring data acquisition unit 201 are sent to the integration processing unit 202. In the integration processing unit 202, these pieces of the status information are integrated on the basis of the table for the integrated status information C in the integration definition output unit 214 and the monitoring data C after the integration is output to the integration status information distribution unit 203, and then the monitoring data C after the integration is displayed in the integrated control terminal 105.

Similar to the status information of equipment in Embodiment 1, regarding the status information of the satellite (originated from monitoring data A) and the status information of the ground station (originated from monitoring data B), it frequently happens that timing at which each of pieces of the status information is obtained is different for each of the satellite 13 and the ground station 12. Thus, when the group of pieces of preset status information is a group from which corresponding preset status information cannot be selected until all pieces of the status information with the same attribute are collected, processing takes much time. In contrast, when there exist status information that is not inputted, there is a case where content of the preset status information can be determined by content of one piece of status information. For example, the table shown in FIG. 6B corresponds to the case. In the case of the table shown in FIG. 6B, when at least one of the status information is "OK" among the status information of the satellite (originated from monitoring data A) and the status information of the ground station (originated from monitoring data B), any preset status information results in "OK".

That is, in the case of the table shown in FIG. 6B, when the status information being "OK" is obtained, the integration processing unit 202 can determine the preset status information to derive the integrated status information. Thus, the status information can be derived quickly. This can be easily performed by preparing, in the preset status information unit 204, such preset status information in the area surrounded by double lines in the table shown in FIG. 6B. In a case where the integrated status information cannot be determined, corresponding preset status information is newly selected from the group of pieces of preset status information when status information that is not inputted is obtained.

Here, an explanation is provided for a case, as an example, where there exists status information that is not inputted. However, in a case where the integrated status information is newly derived when the status information transmitted sequentially is changed from the preceding one, the same processing in that status information that is not inputted is considered to be the preceding status information inputted may be performed. Further, it can be said that, even in the case where the content of the preset status information can be determined by the content of one piece of status information, the integration processing unit 202 performs processing for determining a piece of preset status information corresponding to a combination of pieces of status information with the same attribute being stored in the monitoring data obtained by the monitoring data acquisition unit. A detailed explanation is omitted, because it is similar to that in Embodiment 1.

An operating manager of the integrated control device or the integrated control system according to Embodiment 2 normally monitors the integrated status information C after the integration that is displayed in the integrated control terminal 105, and when the integrated status information C after the integration that is displayed in the integrated control terminal 105 results in "NG", the operator performs detailed monitoring etc. by switching to a detailed monitoring mode etc. in which the status information of the satellite (originated from monitoring data A) and the status information of the ground station (originated from monitoring data B) each are displayed.

Thus, the integrated status information after the integration is displayed in the integrated control terminal 105, so that transmission quantity to the integrated control terminal 105 is suppressed and a line load is reduced. In addition, the amount of status information (amount of monitoring data) confirmed by the operating manager is reduced, so that the burden on the operating manager is reduced.

Embodiment 3

Embodiment 3 of the present disclosure is described. FIG. 7 is a table showing preset status information after creation according to Embodiment 3. It is assumed that the status information of the satellite 13 (originated from monitoring data A) is data having a numerical value ranging from one to three, and the status information of the ground station 12 (originated from monitoring data B) is data having a numerical value ranging from two to five. In Case 2, when
"Data A: 1~2 AND Data B: 4=Data C=1"
"Data A: 3 AND Data B: 5=Data C: 2"
"Data A=Data B=Data C: 3"
"other than listed above cases, Data C: 4"
as logical expressions are inputted from the integrated control terminal 105 to the integration definition input unit 211, a table for the integrated status information C shown in FIG. 7 is created in the integration definition data base unit 212.

The integration definition readout unit 213 reads out, from the integration definition data base unit 212, the table for the integrated status information C in FIG. 7 and outputs the table to the integration definition output unit 214.

The monitoring data A of the satellite 13 and the monitoring data B of the ground station 12 received by the monitoring data acquisition unit 201 are sent to the integration processing unit 202. In the integration processing unit 202, these pieces of the monitoring data are integrated on the basis of the table for the integrated status information C in the integration definition output unit 214 and the integrated status information C after the integration is output to the integration status information distribution unit 203, and then the integrated status information C after the integration is displayed in the integrated control terminal 105.

The operating manager of the integrated control device or the integrated control system according to Embodiment 3 normally monitors the integrated status information C after the integration that is displayed in the integrated control terminal 105. Although the integrated status information C after the integration ranging from one to four is displayed, the monitoring is performed in such a manner that, in accordance with the monitoring level, the operating manager sets a level at which the monitoring mode is switched to a mode such as the detailed monitoring mode. When the integrated status information C after the integration that is displayed in the integrated control terminal 105 results in a value greater than a prescribed numerical value, for example, the numerical value no less than four, detailed monitoring etc. is performed by switching to the detailed monitoring mode etc. in which the status information of the satellite 13 (originated from monitoring data A) and the status information of the ground station 12 (originated from monitoring data B) each are displayed.

Thus, the integrated status information after the integration is displayed in the integrated control terminal 105, so that transmission quantity to the integrated control terminal 105 is suppressed and a line load is reduced. In addition, the amount of monitoring data confirmed by the operating manager is reduced, so that the burden on the operating manager is reduced.

Embodiment 4

Embodiment 4 of the present disclosure is described. FIG. 8 and FIG. 9 are tables showing preset status information after creation, and operators according to Embodiment 4. It is assumed that the status information of the satellite 13 (originated from monitoring data A) is data having a numerical value ranging from one to three, and the status information of the ground station 12 (originated from monitoring data B) is data having a numerical value ranging from two to five. In Case 3($a$), when "Data C=Data A+Data B" as a logical expression is inputted from the integrated control terminal 105 to the integration definition input unit 211, a table for the integrated status information C shown in FIG. 8A is created in the integration definition data base unit 212.

In Case 3($b$), when "Data C=Data A−Data B" as a logical expression is inputted from the integrated control terminal 105 to the integration definition input unit 211, a table for the integrated status information C shown in FIG. 8B is created in the integration definition data base unit 212.

In Case 3($c$), when "Data C=Data A÷ Data B" as a logical expression is inputted from the integrated control terminal 105 to the integration definition input unit 211, a table for the integrated status information C shown in FIG. 9A is created in the integration definition data base unit 212.

In Case 3($d$), when "Data C=Data A×Data B" as a logical expression is inputted from the integrated control terminal 105 to the integration definition input unit 211, a table for the integrated status information C shown in FIG. 9B is created in the integration definition data base unit 212.

In Case 3($e$), when
"Data C=Data A×3 (if Data B=3)"
"Data C=Data A×2 (if Data B≠3)"
as logical expressions are inputted from the integrated control terminal 105 to the integration definition input unit 211, a table for the integrated status information C shown in FIG. 9C is created in the integration definition data base unit 212.

The monitoring by the integrated control terminal 105 using the tables for the integrated status information C in FIG. 8 and FIG. 9 is the same as that in Embodiment 2 and Embodiment 3.

Embodiment 5

Embodiment 5 of the present disclosure is described. FIG. 10 is a table showing preset status information after creation, and operators according to Embodiment 5. It is assumed that the status information of the satellite 13 (originated from monitoring data A) is data having a numerical value ranging from one to three, and the status information of the ground station 12 (originated from monitoring data B) is data having a numerical value ranging from two to five. In Case 4, when
"Data C=1, if Data A>Data B"
"Data C=2, if Data A≤Data B"
as logical expressions are inputted from the integrated control terminal 105 to the integration definition input unit 211, a table for the integrated status information C shown in FIG. 10 is created in the integration definition data base unit 212.

The monitoring by the integrated control terminal 105 using the table for the integrated status information C in FIG. 10 is the same as that in Embodiment 2 and Embodiment 3.

Embodiment 6

Embodiment 6 of the present disclosure is described. FIG. 11 is a table showing preset status information after creation, and operators according to Embodiment 6. The number of pieces of data no less than two is meaningful when the data is subject to the logical operators, the arithmetic operators, and the inequality signs, thus an example where there are four pieces of monitoring data is be described.

The integrated status information E newly created as integrated monitoring data is integrated from status information of the satellite 13 (originated from monitoring data A and B), status information of the ground station 12 (originated from monitoring data C), and status information of the mission facility control device 104 (originated from monitoring data D) using logical operators (AND, OR, NOR), arithmetic operators (+, −, ÷, ×, =, ≠), and inequality signs (≥, >, ≤, <) Definition setting information for the integration is prepared in the preset status information unit 204 in advance.

It is assumed that the status information of the satellite 13 (originated from monitoring data A) is set to "OK" when a prescribed bit is zero and it is set to "NG" when the bit is one, and the status information of the satellite 13 (originated from monitoring data B) is set to "OK" when a prescribed bit is zero and it is set to "NG" when the bit is one. It is assumed that the status information of the ground station 12 (originated from monitoring data C) is set to "OK" when a prescribed bit is 0 and it is set to "NG" when the bit is one. It is assumed that the status information of the mission facility control device 104 (originated from monitoring data D) is set to "OK" when a prescribed bit is zero and it is set to "NG" when the bit is one.

In Case 5, when
"Data A:OK AND Data B:OK AND Data C:OK AND Data D:OK=Data E:OK"
as a logical expression is inputted from the integrated control terminal 105 to the integration definition input unit 211, a table for the integrated status information E shown in FIG. 11 is created in the integration definition data base unit 212.

The monitoring by the integrated control terminal 105 using the table for the integrated status information E in FIG. 11 is the same as that in Embodiment 2 and Embodiment 3.

Embodiment 7

Embodiment 7 of the present disclosure is described. FIG. 12 is a table showing preset status information after creation, and operators according to Embodiment 7.

The following status information in the monitoring data of the satellite 13 exists in order to confirm whether a satellite receiver captures (LOCK) a radio wave from the ground station 12.

Lock/Unlock status of satellite receiver (Data A)

The following status information in the monitoring data of the ground station 12 exists in order to confirm whether the ground station is transmitting (ON) a radio wave to the satellite 13.

Transmission On/Off status of ground station 12 (Data B)
Conventionally, the operating manager has confirmed both of the above Data A and Data B to make a decision for the normality or the abnormality. Note that, Data A and Data B are integrally monitored over two or more pieces of equipment. Thus, it means that Data A and Data B have the same attribute.

In contrast, newly creating the integrated status information C after the integration from the two pieces of data allows the monitoring items (that is, check items) for making a decision to be reduced, so that a decision by an operating manager can be made easily.

In Case 6, as Data C, when

"Lock/Unlock status of satellite receiver (Data A) is Lock AND Transmission On/Off status of ground station (Data B) is On=normal"
"Lock/Unlock status of satellite receiver (Data A) is Unlock AND Transmission On/Off status of ground station (Data B) is Off=normal"
"Other than above listed cases=abnormal"
as logical expressions are inputted from the integrated control terminal 105 to the integration definition input unit 211, a table for the integrated status information C shown in FIG. 12 is created in the integration definition data base unit 212.

The monitoring by the integrated control terminal 105 using the table for the integrated status information C in FIG. 12 is the same as that in Embodiment 2 and Embodiment 3.

Embodiment 8

Figure 13:
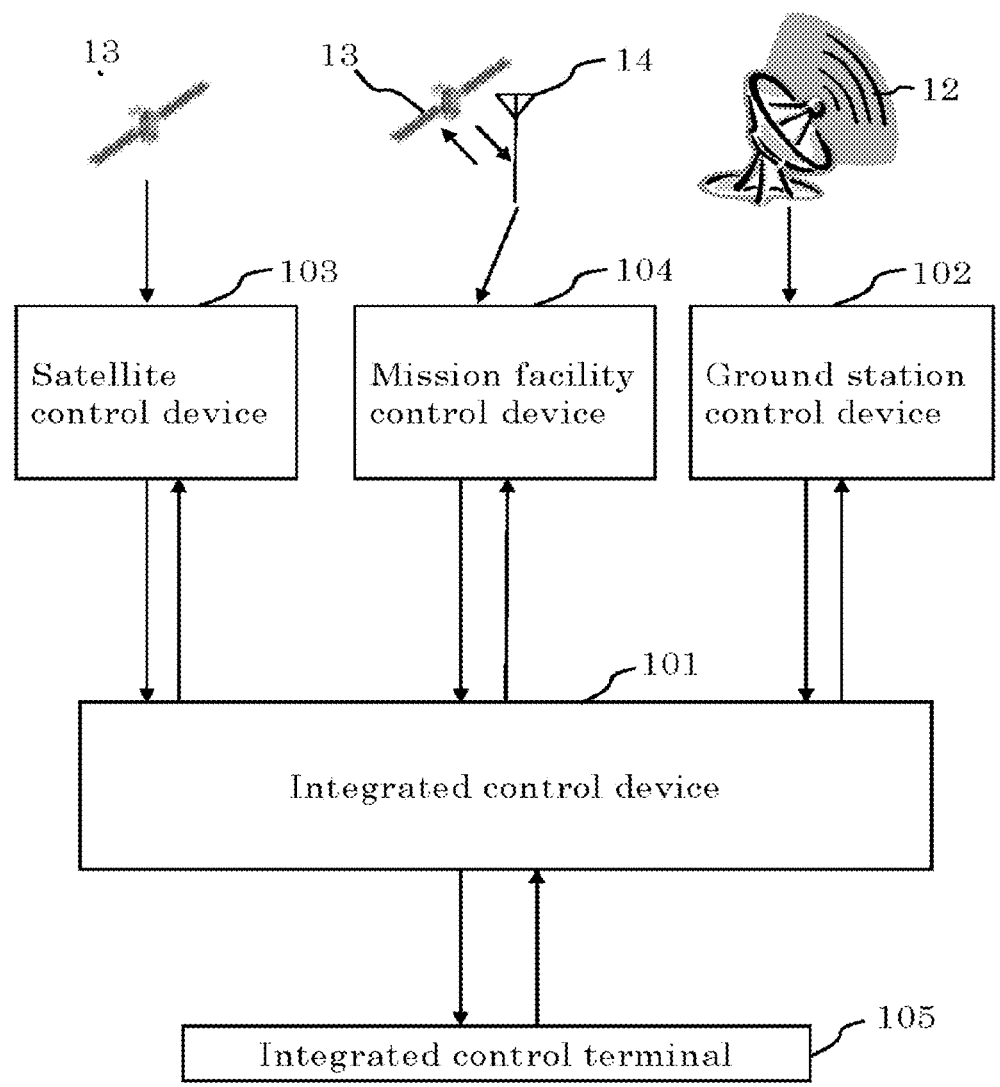
FIG. 13 is a conceptual diagram of monitoring data filtering according to Embodiment 8 of the present disclosure.

Embodiment 8 of the present disclosure is described. The amount of status information that is stored each in the monitoring data of the satellite 13, the mission facility 14, and the ground station 12 is several thousands, and thus a line load is high. Therefore, the status information stored in the monitoring data is reduced by filtering each of pieces of the monitoring data of the satellite 13, the mission facility 14, and the ground station 12, and then the integrated control device 101 receives the reduced status information, so that the line load is reduced. FIG. 13 is a conceptual diagram of monitoring data filtering according to Embodiment 8. It is noted that constituent elements in FIG. 13 corresponding to or the same as the constituent elements in FIG. 4 and FIG. 5 are denoted by the same reference numerals, and descriptions thereof is omitted.

In FIG. 13, the monitoring data where the amount of status information being thousands (for example, five thousands or more) are stored is transmitted from the satellite 13 to the satellite control device 103, the monitoring data where the amount of status information being thousands (for example, two thousands or more) are stored is transmitted from the mission facility 14 to the mission facility control device 104, and the monitoring data where the amount of status information being thousands (for example, two thousands or more) are stored is transmitted from the ground station 12 to the ground station control device 102. If the satellite control device 103, the mission facility control device 104, and the ground station control device 102 send unprocessed monitoring data to the integrated control device 101, the amount of the status information become enormous.

In the integrated control device and the integrated control system according to Embodiment 8 of the disclosure, the integrated control device 101 makes a request for filtering setting to the satellite control device 103, the mission facility control device 104, and the ground station control device 102. The satellite control device 103, the mission facility control device 104, and the ground station control device 102 send to the integrated control device 101, the status information each stored in the monitoring data after the filtering on the basis of the filtering setting requested by the integrated control device 101. The integrated control device 101 derives the integrated status information using each of pieces of the status information filtered, so that a burden on the operating manager is further reduced. Procedures for the filtering are described using FIG. 14 and FIG. 15.

Figure 14:
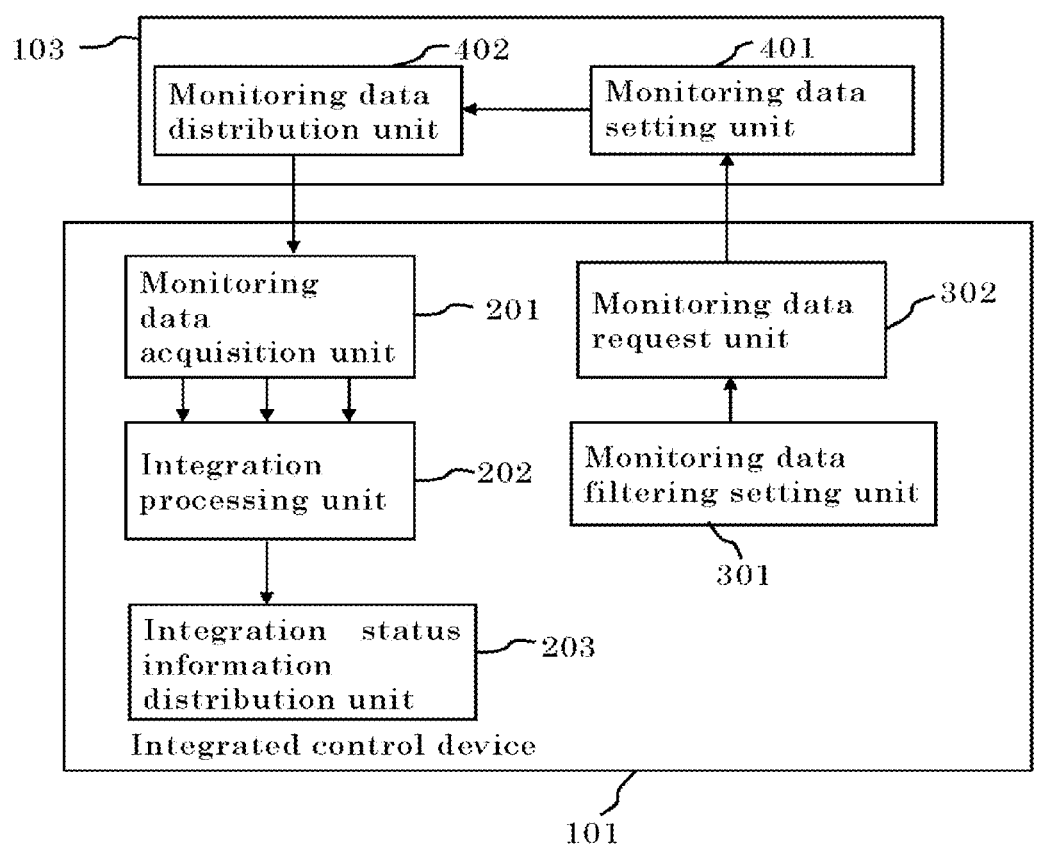
FIG. 14 is a functional block diagram of an integrated control system and a satellite control device in terms of filtering according to Embodiment 8 of the present disclosure.

FIG. 14 is a functional block diagram of the integrated control system 101 and the satellite control device 103 in terms of the filtering according to Embodiment 8. Although the satellite control device 103 is taken up as the control device, the similar diagram can be applied to a case where the mission facility control device 104 or the ground station control device 102 is taken up as the control device. It is noted that constituent elements in FIG. 14 corresponding to or the same as the constituent elements in FIG. 5 are denoted by the same reference numerals, and descriptions thereof is omitted. The integrated control system according to Embodiment 8 includes a monitoring data filtering setting unit 301, a monitoring data request unit 302, a monitoring data setting unit 401, and a monitoring data distribution unit 402 in addition to the constituents described in Embodiment 1 through Embodiment 7. The monitoring data filtering setting unit 301 and the monitoring data request unit 302 are formed inside the integrated control device 101. The monitoring data setting unit 401 and the monitoring data distribution unit 402 are formed inside the control devices (ground station control device 102, satellite control device 103, and mission facility control device 104). Here, as stated above, a case where the control device is the satellite control device 103 is described as an example.

Figure 15:
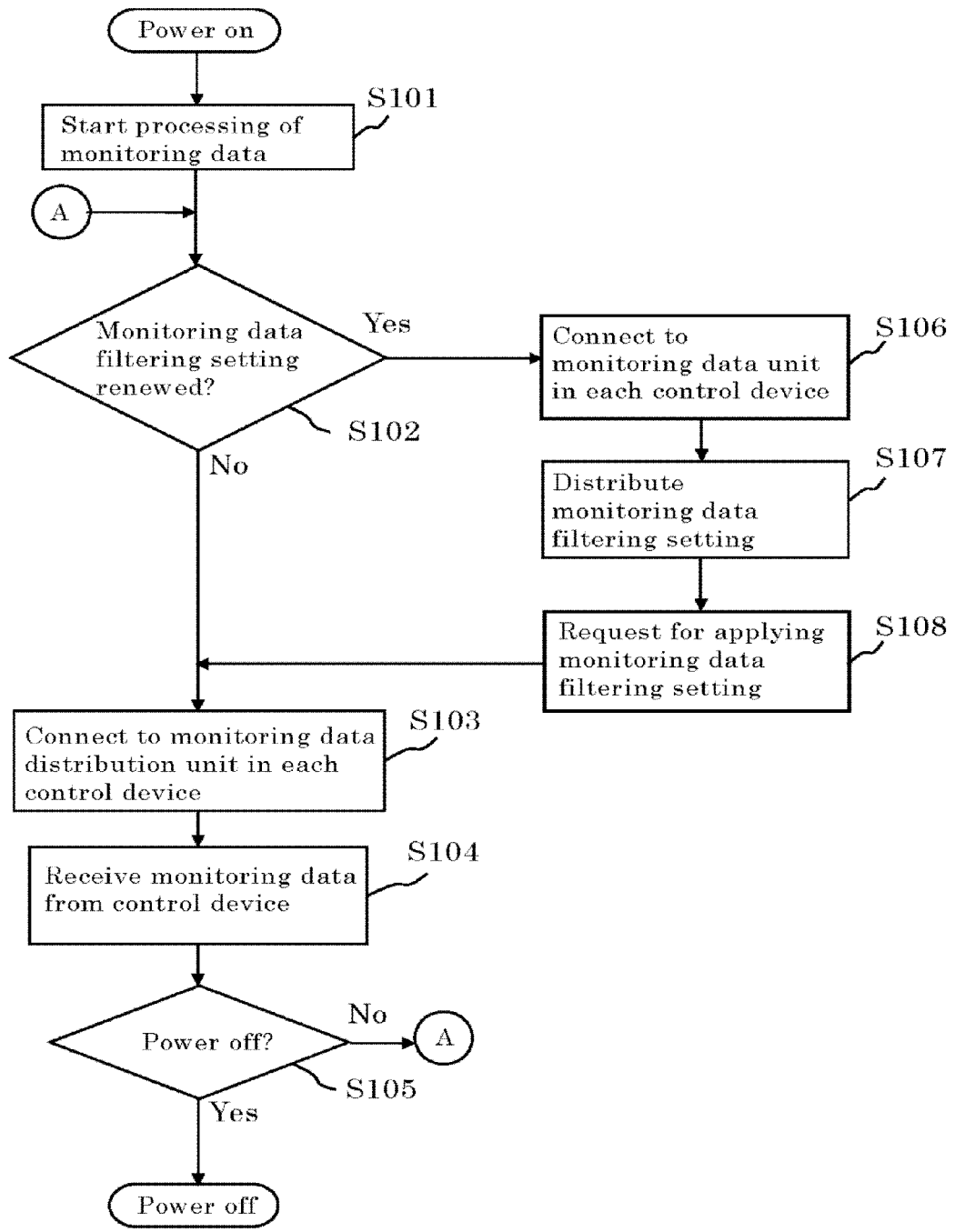
FIG. 15 is a flowchart for a collection of filtered monitoring data according to Embodiment 8 of the present disclosure.

FIG. 15 is a flowchart for a collection of filtered status information according to Embodiment 8. The procedures for the collection of filtered monitoring data are described using FIG. 14 and FIG. 15. In S101, the integrated control device 101 starts processing of the monitoring data. In S102, whether a monitoring data filtering setting in the monitoring data filtering setting unit 301 is updated or not is determined. When the determination result is NO (not updated), in S103, the integrated control device 101 is connected to the monitoring data distribution unit 402 in each control device, and in S104, the integrated control device 101 receives the monitoring data from each control device. In S105, whether the power supply of the integrated control device 101 is turned off or not is determined, and when the result is NO (not turned off), the process proceeds back to S102 as indicated by the connector A on the page where the flowchart is shown.

When the determination result in S102 as to whether the monitoring data filtering setting in the monitoring data filtering setting unit 301 is updated or not is YES (updated), in S106, the monitoring data filtering setting in the monitoring data filtering setting unit 301 is sent to the monitoring data request unit 302. On the basis of the monitoring data filtering setting, the monitoring data request unit 302 is connected to the monitoring data setting unit 401, and in S107, the monitoring data filtering setting is distributed to the monitoring data setting unit 401. In S108, the monitoring data filtering setting distributed to the monitoring data setting unit 401 is distributed to the monitoring data distribution unit 402, and a request is made so that the monitoring data filtering setting is applied to the monitoring data transmitted to the integrated control device 101. Then in S103, the integrated control device 101 is connected to the monitoring data distribution unit 402 in each control device, and in S104, the integrated control device 101 receives the filtered monitoring data from each control device. In S105, whether the power supply of the integrated control device 101 is turned off or not is determined, and when the result is NO (not turned off), the process proceeds back to S102 as indicated by the connector A on the page where the flowchart is shown.

By the filtering of the monitoring data in the integrated control system according to Embodiment 8, the satellite control device 103 can reduce the amount of the status information from the satellite 13 from five thousands or more down to less than one thousand or less. Similarly, by the filtering of the monitoring data in the integrated control system according to Embodiment 8, the mission facility control device 104 and the ground station control device 102 each can reduce the amount of the status information from two thousands or more down to less than one thousand or less. By the filtering of the monitoring data described above, the integrated control device 101 collects the filtered status information amounting to two thousands, thus the amount of the integrated status information is reduced to two thousands or less.

EXPLANATION OF REFERENCE NUMERALS 1 equipment (control device)
2 equipment (control device)
3 equipment (control device)
11 integrated control system
12 ground station (earth station)
13 satellite
14 mission facility
101 integrated control device
102 ground station control device (earth station control device)
103 satellite control device
104 mission facility control device
105 integrated control terminal
201 monitoring data acquisition unit
202 integration processing unit
203 integration status information distribution unit
204 preset status information unit
211 integration definition input unit
212 integration definition data base unit
213 integration definition readout unit
214 integration definition output unit
301 monitoring data filtering setting unit
302 monitoring data request unit
401 monitoring data setting unit
402 monitoring data distribution unit

The invention claimed is:

1. An integrated control device that assigns, from among status information of monitoring target functions that is stored in monitoring data and is provided for each of a plurality of pieces of equipment to be monitored, a same attribute to a plurality of pieces of status information of monitoring target functions integrally monitored over at least two or more pieces of the equipment, and that integrates the plurality of pieces of status information of the monitoring target functions for each attribute, to derive integrated status information, the integrated control device comprising:

a monitoring data acquirer obtaining the monitoring data from each of the plurality of pieces of equipment; and
an integration processor determining a determined preset status information by applying each piece of the monitoring data having a same attribute obtained by the monitoring data acquirer to a corresponding lookup table in a plurality of lookup tables each providing a mapping from each possible combination of monitoring data obtained from each of the plurality of pieces of equipment to the determined preset status information according to a predetermined rule, the integration processor treating the determined preset status information as the integrated status information, and
the predetermined rule that maps the monitoring data to the determined preset status information in each of the lookup tables corresponds to first applying an arithmetic operator to a numerical representation of at least one piece of the monitoring data having the same attribute from each piece of equipment, and second applying a logical operator to one or more of the results of applying the arithmetic operator to the numerical representation of each piece of the monitoring data having the same attribute from each piece of equipment.

2. The integrated control device according to claim 1, wherein the equipment is any one of a satellite, a mission facility for a satellite, and a ground station for a satellite.

3. The integrated control device according to claim 2, wherein the monitoring data acquirer obtains the monitoring data of the equipment through a control device that controls operation of the equipment.

4. An integrated control device that assigns, from among status information of monitoring target functions that is stored in monitoring data and is provided for each of a plurality of pieces of equipment to be monitored, a same attribute to a plurality of pieces of status information of monitoring target function integrally monitored over at least two or more pieces of the equipment, and that integrates the plurality of pieces of status information of the monitoring target functions for each attribute, to derive integrated status information, the integrated control device comprising:
 a monitoring data acquirer obtaining the monitoring data from each of a plurality of pieces of the equipment; and
 an integration processor carrying out an operation of applying a predetermined operator being set for each attribute to pieces of status information with the same attribute included in the monitoring data obtained by the monitoring data acquirer, and the integration processor treating a result of the operation as the integrated status information, or treating information associated beforehand with the result of the operation as the integrated status information,
 the predetermined operator includes first applying an arithmetic operator to a numerical representation of each piece of the monitoring data having the same attribute from each piece of equipment, and second applying a logical operator to one or more of the results of applying the arithmetic operator to the numerical representation of each piece of the monitoring data having the same attribute from each piece of equipment.

5. The integrated control device according to claim 4, wherein the equipment is any one of a satellite, a mission facility for a satellite, or a ground station for a satellite.

6. The integrated control device according to claim 5, wherein the monitoring data acquirer obtains the monitoring data of the equipment through a control device that controls operation of the equipment.

* * * * *